US006463530B1

United States Patent
Sposato

(10) Patent No.: US 6,463,530 B1
(45) Date of Patent: Oct. 8, 2002

(54) METHOD AND APPARATUS FOR REMOTELY BOOTING A CLIENT COMPUTER FROM A NETWORK BY EMULATING REMOTE BOOT CHIPS

(75) Inventor: Dennis Sposato, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/329,457

(22) Filed: Jun. 10, 1999

(51) Int. Cl.⁷ .............................................. G06F 9/445
(52) U.S. Cl. ............................. 713/2; 713/1; 713/100; 709/220; 709/221; 710/104
(58) Field of Search ................................. 713/1, 2, 100; 709/220, 221, 223, 203, 208; 710/104, 10; 711/170

(56) References Cited

U.S. PATENT DOCUMENTS

| | | | |
|---|---|---|---|
| 5,146,568 A | | 9/1992 | Flaherty et al. .............. 395/325 |
| 5,280,627 A | | 1/1994 | Flaherty et al. .............. 395/700 |
| 5,452,454 A | * | 9/1995 | Basu ........................... 395/700 |
| 5,577,210 A | * | 11/1996 | Abudous et al. ............. 709/220 |
| 5,802,297 A | * | 9/1998 | Engquist ...................... 709/212 |
| 5,842,011 A | | 11/1998 | Basu ............................ 395/652 |
| 5,875,306 A | * | 2/1999 | Bereiter ....................... 709/200 |
| 5,974,547 A | * | 10/1999 | Klimenko ....................... 713/2 |
| 5,978,911 A | * | 11/1999 | Knox et al. ..................... 713/1 |
| 6,151,674 A | * | 11/2000 | Takatani ......................... 713/2 |
| 6,199,108 B1 | * | 3/2001 | Casey et al. ................. 709/220 |

* cited by examiner

Primary Examiner—Jeffrey Gaffin
Assistant Examiner—Rijue Mai
(74) Attorney, Agent, or Firm—Duke W. Yee; David A. Mims, Jr.; Stephen R. Tkacs

(57) ABSTRACT

A method and apparatus for booting a client computer connected to a network without a boot ROM and without an operating system is provided. Instructions from a BIOS ROM are executed to load a boot code loader from a nonvolatile, read/write memory, such as a diskette or hard disk. The boot code loader executes to load a control program from the diskette, and the control program executes to load a set of programs and/or device drivers from the diskette without loading an operating system. The set of programs and/or device drivers communicate with a network server to retrieve a boot program from the network server, and the boot program executes to complete the boot process of the client, such as downloading an operating system from the server.

30 Claims, 5 Drawing Sheets

METHOD AND APPARATUS FOR REMOTELY BOOTING A CLIENT COMPUTER FROM A NETWORK BY EMULATING REMOTE BOOT CHIPS

BACKGROUND OF THE INVENTION

1. Technical Field

The present invention relates, in general, to a method, system, and computer-program product for improved data processing in a computer system and, in particular, to a method, system, and computer-program product for providing an improved booting process for a data processing system.

2. Description of Related Art

In the early 1980s, as the first PC's were sold, people in the Information Systems (IS) industry thought that PC's might replace mainframe computers and cut operating costs drastically. Over the years, as personal computers gained more functionality and better user interfaces, end-users improved their productivity and ability to generate data. While enterprise data and legacy applications were still placed on the more reliable mainframe platforms, there was more and more need for distributed access to application and data resources.

The IS industry succeeded in connecting the two worlds of PC's and mainframes by implementing a client/server model with distributed databases. With the evolution of multi-platform applications over a variety of networking infrastructures, it appeared that PC's might replace mainframe computers. However, as people in the IS industry realized the immense overall costs of this approach, the client/server model evolved in many directions.

The choice of a wider variety of computer platforms improves the enterprise's ability to make appropriate investments in the evolving computing marketplace. The following is a description of various computer platforms and some of their characteristics.

Non-Programmable Terminals (NPT's) are often found in large enterprises connected to host-based applications systems. With the NPT, the user interface is managed and controlled by the central processing system. Historically, these terminals were the first to bring end-user access to information in the enterprise's central databases.

Network Computers (NC's), based on RISC processors, offer greater versatility than NPT's because they have a built-in capability to run emulation software and to provide access to Java™ and Windows™-based applications, such as browsers. NC's are typically implemented with only a general purpose processor, a system memory, and a communications port. Although other types of peripheral devices may be included, local drives, such as hard disk and floppy drives, are characteristically absent from such data processing systems. While the primary reason for not providing a local drive within such data processing systems is cost-saving, other reasons may include low-power requirement and compactness. Therefore, NC's typically rely upon network access to provide dynamic, non-volatile data storage capability. Managed PC's provide an Intel-based (or compatible) hardware platform that offers one the ability to run network computing operating systems. NC's and managed PC's are very similar. The major difference is that NC's generally have sealed cases and are not upgradeable, while managed PC's have locked covers and can be upgraded.

Traditional PC's, such as desktop and laptop PC's, are designed to offer highly sophisticated end-user environments. People who travel a lot, or who work at various locations, may use laptop PC's that require local, nonvolatile storage devices and a fully functional set of applications wherever they are, whether or not there is network connection available. The installation of workgroup computing software and complete application suites requires a powerful machine with significant local networking capabilities.

Each of the various network computing platforms has advantages and disadvantages. NPT's have the advantage of presenting a standard platform to each user. However, as users become more technically sophisticated through everyday use of various computing devices, users demand more options in their access to data and to computing resources, which may not be available through the use of NPT's. Managed PC's may have the ability to be tailored for sophisticated users, but as their name implies, managed PC's are purposely restricted in the number and variety of the software applications and hardware configurations which are presented to the user.

Traditional PC's on a network have the advantage of providing extensive flexibility. In order to accommodate their need for computing resources, users may add peripherals and software applications directly to a PC, while a network administrator may provide other resources on the network for many users in a common fashion. The disadvantages include the immense burden placed on a network or system administrator in ensuring that the various PC's retain some semblance of a standard configuration. Certain operating systems, such as Microsoft Windows NT, provide various levels of system administration capabilities for accomplishing such tasks. However, enormous costs and amounts of time may be spent in accommodating user preferences while ensuring corporate directives for the use of standard configurations.

One of the main advantages of network computing is the any-to-any type of connectivity between applications without having to worry about the hardware or software platforms in use. Network computing can be described as the use of different open technologies providing connectivity, ease-of-use, application functionality, information access, scalability, and systems management across widely dispersed types of networks. By making use of open standard technologies, network computing provides many advantages of the client/server paradigm while avoiding its numerous disadvantages. This goal could be achieved by the implementation of standards on all the platforms involved, such as TCP/IP, for the networking protocol, and 100% pure Java™ applications, in the hope that it will lead to truly portable applications, and solutions where in the network computing environment, all devices are able to easily communicate with one another.

Another advantage of network computing with NC's is the ability to provide functions for accessing data and applications while reducing the overall costs of operating an enterprise-wide environment. One may choose from a wider scope of configurations for the NC's to fit corporate requirements and reduce the overall costs. However, if the network computing environment is not managed properly, the administrative time and costs may be greater than those incurred in a traditional PC network. One disadvantage is that NC's, relative to other technologies, are still in a development and exploratory stage, although the IS industry believes that a networking platform with NC's may provide user-desired preferences while accomplishing corporate goals.

A common problem in many computing platforms is the necessity to maintain system administrative knowledge of enterprise-wide computer configurations while allowing some type of flexibility in the computer configurations. Part of the problem includes supporting multiple operating systems with more operating systems continuing to be developed and deployed. A portion of any solution to the configuration-maintenance problem must also address the operating system configuration within the enterprise.

Looking towards a transition to network computing, the new network computing devices will not entirely replace the PC. Because different users have varying application needs, different technologies have to be employed to serve those needs, and those different technologies will be accompanied by different operating systems. Hence, there is a need for enterprise-wide support of multiple operating systems for these different computing platforms.

One solution to supporting multiple operating systems has been to develop the ability to boot a local client or NC through a remote server. In the normal operation of a stand-alone computer system, a user issues a boot command to the computer. The computer responds to the boot command by attempting to retrieve the operating system image files. Configuration data files are also needed to configure the specific machine with the hardware parameters necessary for the specific hardware configuration. These files also contain information needed to initialize the video, printers, and peripherals associated with that particular machine. For example, the files would include CONFIG.SYS in the MS-DOS operating system, available from Microsoft Corporation.

By booting through a remote server, the operating system image files may be maintained commonly on the server in an effort to control computer configurations. The network computing approach frequently provides three tiers of computing platforms consisting of: a client workstation, which handles the user interface and a minimal set of application functions; a server, which provides the major application functions and which may provide access to legacy data and legacy applications; and a central network. In a system where the computer has no nonvolatile memory means, the computer cannot retrieve the boot information from within the computer itself. In that case, the client sends a boot request via the network to a server, which may be acting as a boot server.

One prior art computing environment that employs remote booting provides a protocol for remote booting called Remote Initial Program Load (RIPL). RIPL is the process of loading an operating system onto a workstation from a location that is remote to the workstation. The RIPL protocol was co-developed by 3Com, Microsoft, and IBM. It is used today with IBM OS/2 Warp Server, DEC Pathworks, and Windows NT. Two other commonly used Remote IPL protocols are a Novell NCP (NetWare Core Protocol), and BOOT-P, an IEEE standard, used with UNIX and TCP/IP networks.

RIPL is achieved using a combination of hardware and software. The requesting device, called the requester or workstation, starts up by asking the loading device to send it a bootstrap program. The loading device is another computer that has a hard disk and is called the RIPL server or file server. The RIPL server uses a loader program to send the bootstrap program to the workstation. Once the workstation receives the bootstrap program, it is then equipped to request an operating system, which in turn can request and use application programs. The software implementations differ between vendors, but theoretically, they all perform similar functions and go through a similar process.

In this environment, the client workstation requires a special ROM installed on its LAN adapter or Network Interface Card (NIC). This ROM is known generally as a remote boot ROM, but two specific examples of remote boot chips are the RIPL chip, which supports ANSI/IEEE standard 802.2, and the Preboot Execution Environment (PXE) chip, which is used in the TCP/IP environment. The following discussions use the RIPL chip/protocol as an example but would be generally applicable to an environment using PXE chips as well.

The RIPL ROM contains the initial code to begin the booting process. After the RIPL ROM on the network adapter card receives the boot block from the boot server, the boot block gets control and then emulates a floppy drive by taking over the floppy drive interrupt (Int 13h). As far as the workstation is concerned, it then has a floppy drive with a write-protected bootable disk in it.

When the workstation starts up and issues a read request, the boot block intercepts the request and converts it into a network read request. Instead of reading data from the floppy, the data comes from the modified boot image file on the boot server. For the RIPL function to be operational on a network, the network must have a RIPL server and one or more workstations with the necessary boot block module on its network adapters.

Since the workstation thinks that it has a floppy drive, it requires all of the low-level data normally contained on a floppy disk. This includes the system sectors, FAT table, and directory tables. The Boot ROM obtains this information from a modified boot image file created on the server. The diskette image consists of a CONFIG.SYS file and the necessary device drivers that are required for the desired configuration. The modified boot image file is an exact image of the floppy that the workstation believes is in the floppy drive.

The client operating system image and all applications reside on servers. The client does not have local nonvolatile storage, i.e., storage that persists from one logon session to another, and end-user data is stored elsewhere on the network, usually on the server. When the end-user logs off or turns off the client, the operating system, programs, and end-user data are no longer available to the end-user and are reloaded from the server when the client reboots.

After the end-user logs on, the end-user desktop may then display the program objects for each application for which the end-user has access. When the end-user selects an application to run, the application launcher starts the application. The application launcher is a utility that attaches the appropriate network devices, sets up the environment, requests the application from the server, and starts the application on the client machine. When an application is started, the application environment is established, e.g., PATH, DPATH, and LIBPATH values. File access requests are routed based on the in-memory merge of the machine FIT (File Index Table) and user FIT tables. When an application exits, the application launcher releases network devices used solely by the application.

While the process outlined above has many advantages for booting a computer that lacks nonvolatile storage, such as a network computer, the computer is required to have a boot ROM. This requirement places another constraint on the goal of flexible configuration management because any computer which has this feature must be supported in a different manner from those computers that do not have this feature. New technology may also induce costly hardware upgrades and administrative expenses to physically change the hardware. The fact that the hardware-based process does not allow any user interaction with the remote boot process is another disadvantage.

Therefore, it would be useful to have a method and system for remote booting of computers without boot ROMs. It would be particularly advantageous for the method and system to provide for other features in a flexibly configurable yet administratively supportive manner.

SUMMARY OF THE INVENTION

The present invention provides a method and apparatus for booting a client computer connected to a network without a boot ROM and without an operating system. Instructions from a BIOS ROM are executed to load a boot code loader from a nonvolatile, read/write memory, such as a diskette or hard disk. The boot code loader executes to load a control program from the diskette, and the control program executes to load a set of programs and/or device drivers from the diskette without loading an operating system. The set of programs and/or device drivers communicate with a network server to retrieve a boot program from the network server, and the boot program executes to complete the boot process of the client, such as downloading an operating system from the server.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
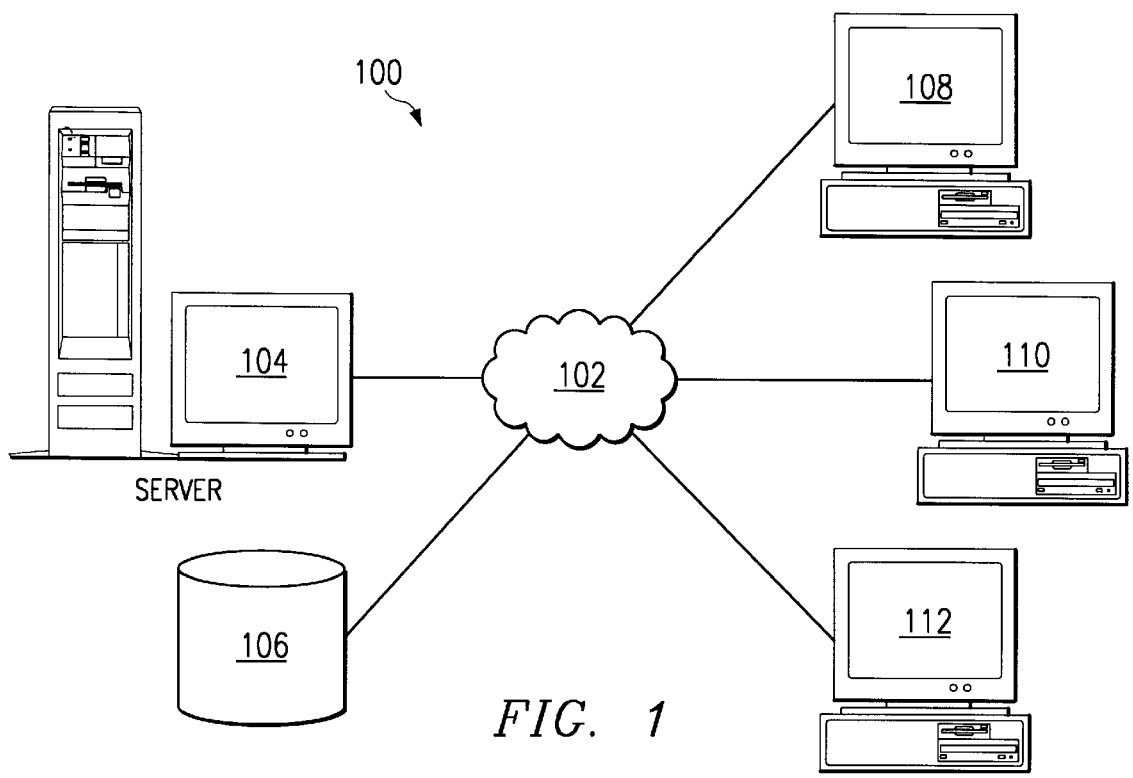
FIG. 1 is a block diagram of a distributed data processing system, which may be utilized in conjunction with a client-server environment.

With reference now to the figures, FIG. 1 depicts a pictorial representation of a distributed data processing system in which the present invention may be implemented and is intended as an example, and not as an architectural limitation, for the processes of the present invention.

Distributed data processing system 100 is a network of computers which contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Server 104 may also act as a boot server because it stores the files and parameters needed for booting each of the unique client computers systems 108–112.

Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as for example, an intranet, a local area network (LAN), or a wide area network (WAN).

Figure 2:
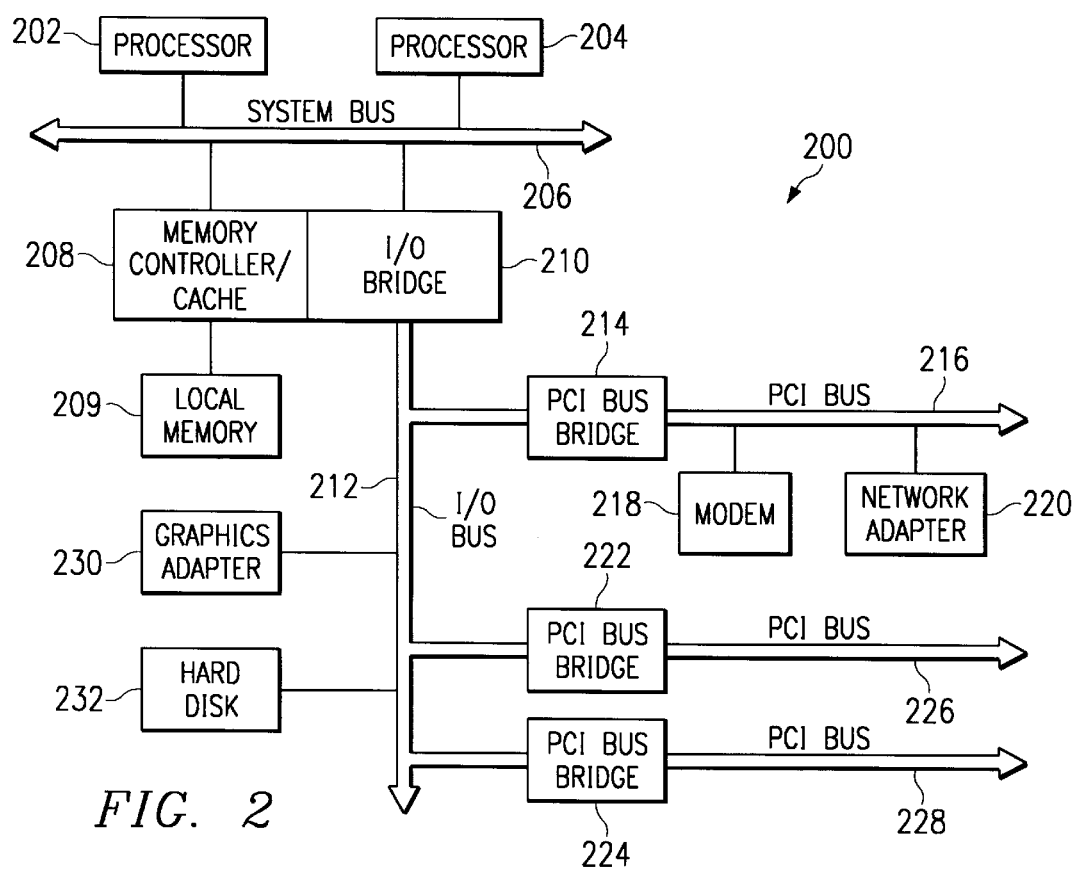
FIG. 2 is a block diagram of a server computer, which may be utilized in conjunction with a client-server environment.

Referring to FIG. 2, a block diagram depicts a data processing system, which may be implemented as a server, such as server 104 in FIG. 1 in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. Modem 218 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, New York, running the Advanced Interactive Executive (AIX) operating system.

Figure 3:
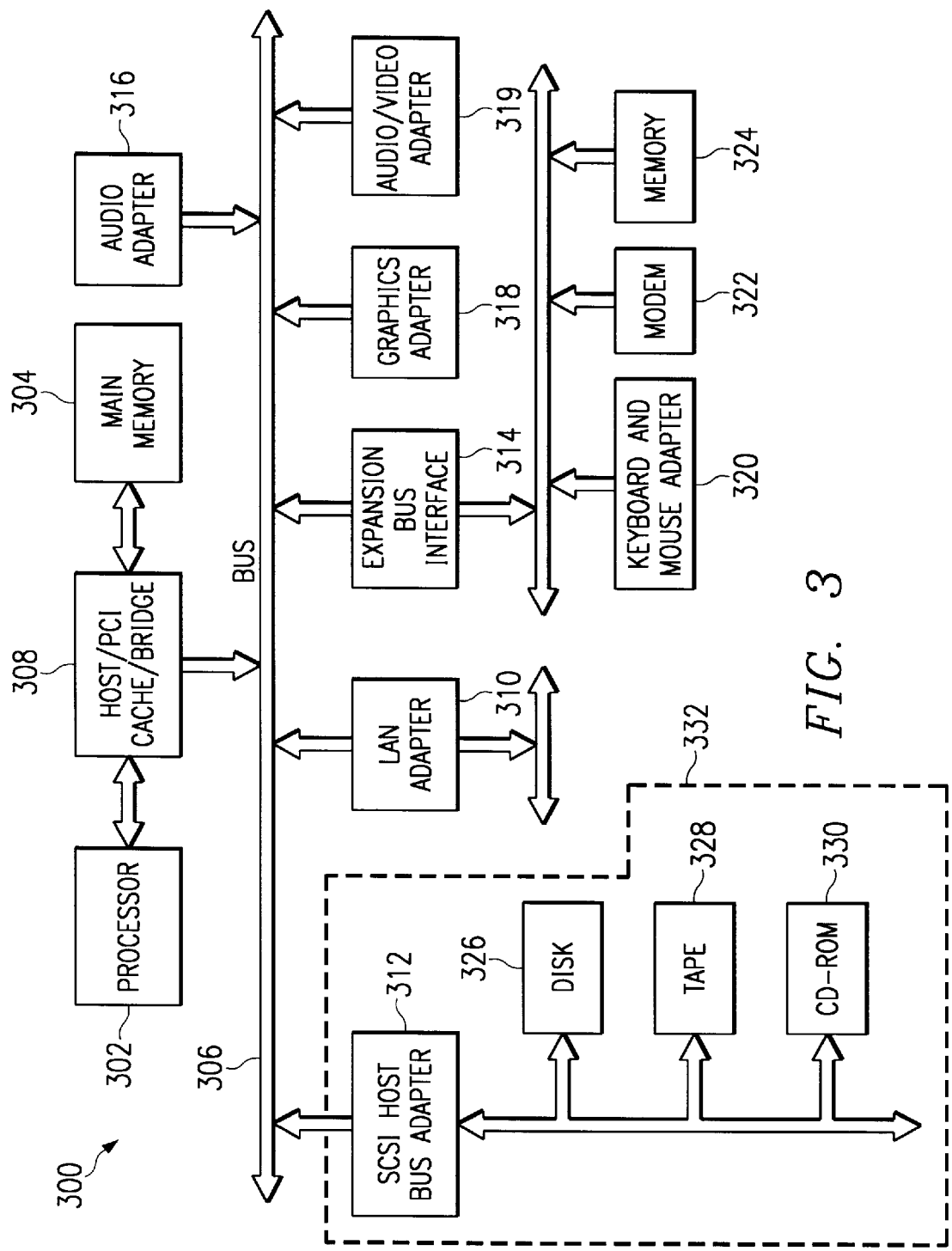
FIG. 3 is a block diagram of a computer, which may be utilized as a stand-alone computer or as a client computer in conjunction with a client-server environment.

With reference now to FIG. 3, a block diagram illustrates a data processing system in which the present invention may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Inc. Instructions for the operating system, the object-oriented operating system, and applications or programs may be located on storage devices, such as hard disk drive 326, and they may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by the box with the dotted line in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations with respect to the present invention.

The present invention provides a method and system for Remote Client Boot (RCB). RCB allows a PC to boot from a network without a RIPL (Remote Initial Program Load) ROM chip installed on a Network Interface Card (NIC) and without the overhead of an operating system.

RCB is a limited set of functions whose only task is to bring down a self-loading module from the server and give it control. Once the file is completely downloaded, RCB relinquishes control of the system in favor of the newly retrieved module. At that point, all of RCB's work is completed in a manner similar to a boot ROM.

RCB is a series of small programs that establish a conversation with a LAN server. The process begins with the Boot Code Loader (BCL) that loads a control program which, in turn, loads all other components of the system. This can be done from either the hard disk or diskette.

RCB uses the NIC's manufacturer-provided, NDIS-compatible (Network Driver Interface specification), DOS device drivers to communicate with the NICs. To accomplish this, RCB emulates the DOS APIs that the device drivers require. This minimizes the level of knowledge of each NIC that RCB supports. Each device driver is different, so additional code may be needed in RCB for each NIC. As RCB uses the NDIS specification, support is included for the NDIS protocol manager device driver PROTMAN.DOS specifically for the parsing of the PROTOCOL.INI file, which is a NDIS requirement. In a preferred embodiment, the NIC is a 3Com 3C509B PCI Ethernet card, which uses the EL90X.DOS device driver, or a 3Com 3C589 PCMCIA Ethernet card, which uses the ELPC3.DOS device driver.

A Message Formatter (MF), a hybrid application program combined with a device driver, communicates with the hardware drivers to establish the conversation with the LAN server. The entire RCB executes without the use of a conventional operating system. More information about the dialog between the MF, PROTMAN, and the Media Access Control (MAC) (the hardware device driver that controls the NIC) may be found in "3Com/Microsoft LAN Manager Network Driver Interface Specification", Version 2.0.1, hereby incorporated by reference.

RCB is a small collection of self-supporting, self-loading, Intel 80×86 real-mode-architecture programs that provide limited emulation of DOS operating system functionality such that Media Access Control (MAC) device drivers can execute according to the NDIS. Two of the RCB modules are parameter driven through the use of initialization (.INI) files. The basic purpose of these files is to tell RCB which modules to load and in what order.

The LAN conversational components of RCB, that is, the modules that "talk" over the LAN, are located in the highest part of a machine's real memory. Their task is to conduct a very brief conversation with a server. This dialog consists of only two messages from RCB: "Find" and "Get File". RCB sends the Find message repeatedly until a network server recognizes it. The server sends a "Found" message back to RCB that, in turn, sends the "Get File" message to the server. This file is commonly called RIPLBOOT.SYS. Upon receipt of this message, the server sends a stream of file segments to RCB. When the last segment of this file has been processed, RCB then gives it control at an entry point dictated by the last segment message. At this point, RCB's job is done and RIPLBOOT.SYS is free to execute in a completely pristine environment.

RCB uses three, user-changeable, parameter files, described in further detail below:

BCL.INI—used by the Boot Code Loader (BCL). This file tells the BCL which user-selected file/operating system, to load. It can be used to load any file or system, not only RCB. It can be used to load JavaOS (Jospxe.bin) or even DOS. The BCL consists of two components—the Master Boot Record (MBR) and the RDTIO module. The MBR is the first sector of a disk media, located at Cylinder 0, Head 0, Sector 1, on every disk or diskette. The RDTIO module that supplies I/O capabilities to BCL for reading multi-segmented files.

RCP.INI—used by the RDT Control Program, which is responsible for loading and supporting DOS device drivers. RCP.INI contains a "load list" of modules required to support a particular NIC.

PROTOCOL.INI—used by PROTMAN.DOS and the MAC (the hardware manufacturer's device drivers that controls the NIC). This could be a copy of the same .INI file that is downloaded as part of RIPLBOOT.SYS (the name of the file that is downloaded from the server and given control of the system by RCB). PROTMAN is a DOS protocol manager that is responsible for parsing the PROTOCOL.INI file and for initiating communications between the MAC driver and RIPLMF.

Figure 4:
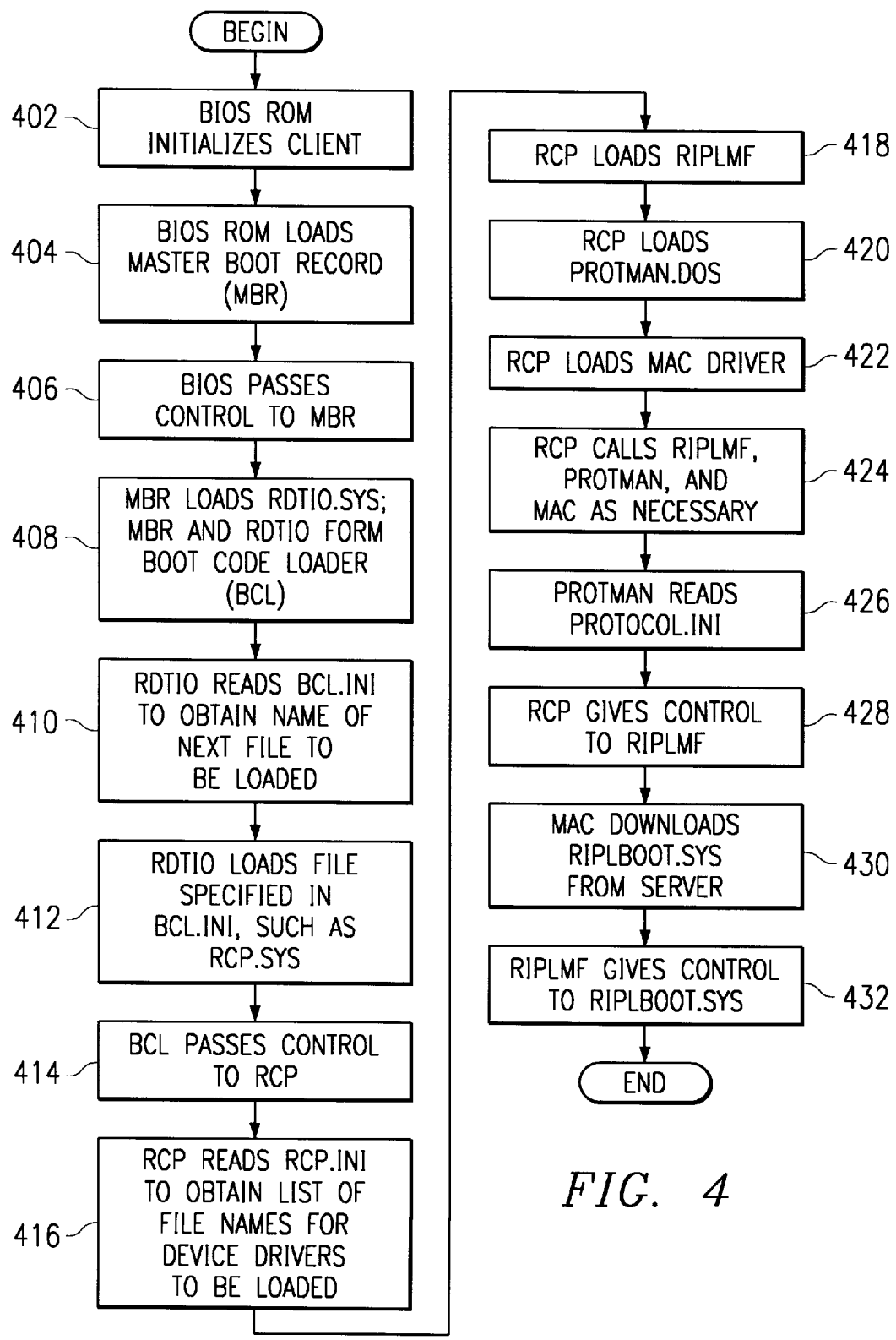
FIG. 4 is a flowchart depicting the steps used in the Remote Client Boot of the present invention.

With reference now to FIG. 4, a flowchart depicts the steps used in the Remote Client Boot of the present invention.

When a PC is booted, the BIOS ROM chip initializes the system by executing POST (Power-On Self-Test) code and by setting up the BIOS vector tables in low memory and by selecting a boot source (step 402). On newer systems, this is a selectable parameter in the hardware system BIOS setup procedure. If the system has been allowed to select a diskette drive as a boot device, BIOS ROM instructions reads the first sector of the diskette into memory at a predefined location (step 404). This sector 15 called the Master Boot Record (MBR). The BIOS then gives control to MBR (step 406).

In RCB, the MBR is part of a two-stage process called the Boot Code Loader (BCL). The MBR contains a micro file system with the ability to load a single additional sector from diskette (step 408). This sector is a file called RDT Input Output module (RDTIO). RDTIO and the MBR make up the BCL. RDTIO adds enough capability to the file system to allow reading additional files, such as an .INI file called BCL.INI that contains the name of the next file to load (step 410). BCL.INI specifies a file that contains a self-supporting program or module, as it will be given control at a predetermined area and BCL will terminate execution, leaving the newly loaded module on its own. In RCB's case, this file's name is RCP.SYS, or the "RDT Control Program", which can be thought of as a set of self-supporting functions. RDTIO loads RCP.SYS (step 412) and passes control to it (step 414).

RCP's task is to load additional files, such as device drivers, provide DOS function emulation in support of these drivers, and load other components of RCB, specifically the RIPL Message Formatter (RIPLMF). RCP receives its instructions from an .INI file called RCP.INI (step 416). These instructions are in the form of file names. The RIPLMF is loaded first (step 418) followed by the device drivers. The DOS Protocol Manager (PROTMAN.DOS) is usually loaded next (step 420) followed by the NIC driver, also referred to as the MAC driver (step 422). The RCP will call each driver (step 424), in turn, allowing it to perform its initialization routines, open files, display messages, etc. PROTMAN.DOS will request a file called PROTOCOL.INI to be read in during this time (step 426). This file is requested by the MAC driver from PROTMAN during an inter-module conversation when the MAC is initialized. The MAC causes messages to be sent and received on the LAN.

When all initialization is complete, RIPLMF is given control (step 428), and the services of RCP are no longer required. RIPLMF will carry on a conversation with the MAC, requesting it to send certain messages out on the LAN. The MAC will communicate with the server to obtain the boot block, called RIPLBOOT.SYS. When this file is downloaded (step 430), RIPLMF will perform some house-keeping routines and give control to RIPLBOOT.SYS (step 432). RIPLBOOT then completes the boot process to load an operating system from the network server (step 434).

Figure 5:
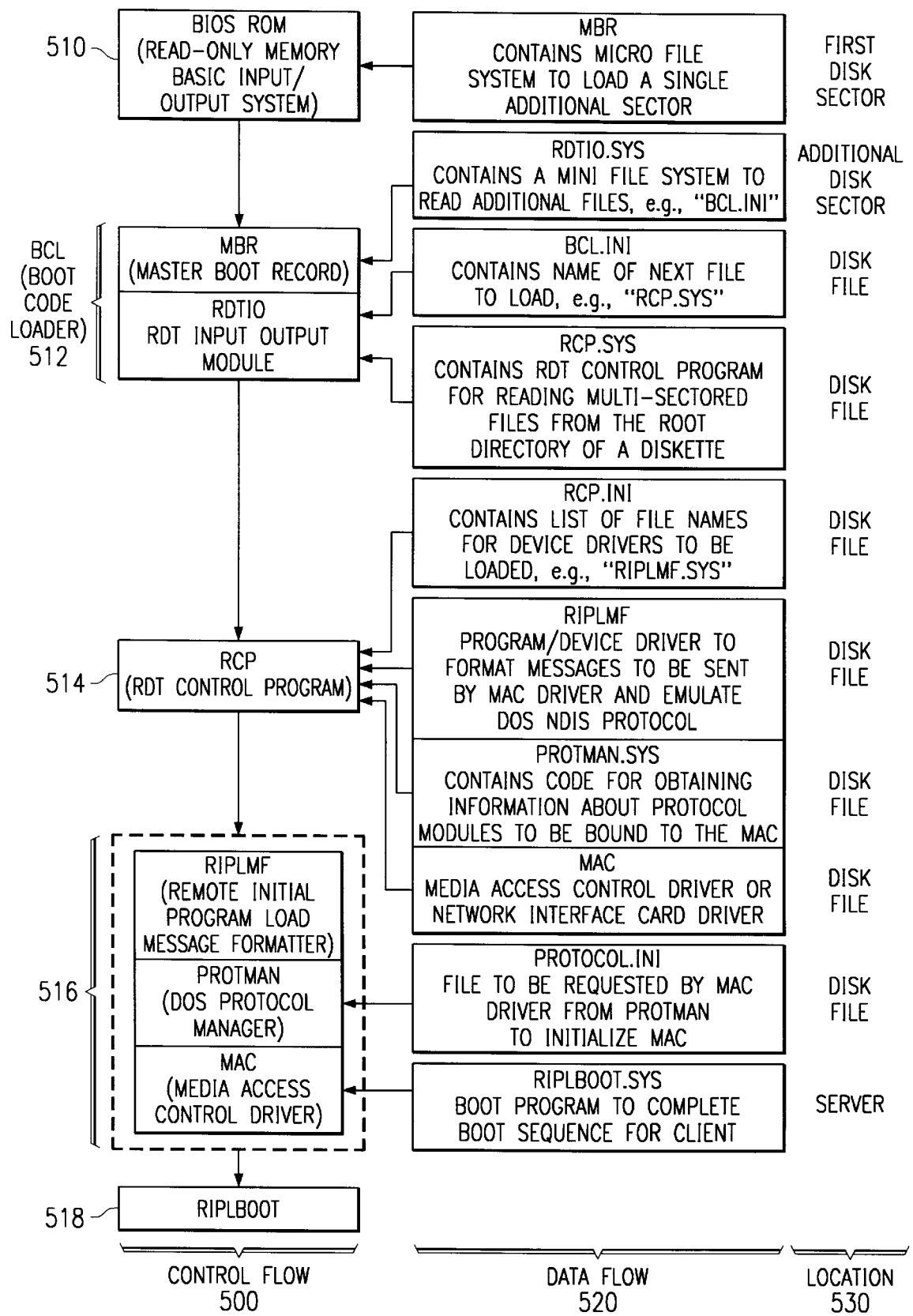
FIG. 5 is a flowchart depicting the control flow, the data flow, and the location of data and instructions used in the Remote Client Boot of the present invention.

With reference now to FIG. 5, a flowchart depicts the control flow, the data flow, and the location of data and instructions used in the Remote Client Boot of the present invention. This figure provides a slightly different perspective on the present invention compared with FIG. 4, showing the manner in which files are loaded and then the order in which the code segments within the files obtain control.

Control flow 500 shows the manner in which a program, device driver, or set of instructions passes control from one component to another. A generalized sequence of steps performs part of the boot sequence of the client, and each step completes a portion of the sequence before relinquishing control to the next portion.

Each of these components comprises instructions that are executed to perform a set of functions. BIOS ROM 510 initializes the client, loads BCL 512, and passes control to BCL 512. As shown, BCL 512 may contain a plurality of components that are not necessarily executed sequentially before relinquishing control. Once BCL 512 has loaded RCP 514, BCL 512 passes control to RCP 514, which loads components 516, which may contain programs and/or device drivers. RCP 514 may direct control of components 516 or may pass control to components 516, which are not necessarily executed sequentially. Once RIPLBOOT program 518 has been retrieved from the server, control of the client computer is relinquished to RIPLBOOT program 518, which then proceeds to download an operating system from the server and completes the boot process for the client.

Data flow 520 shows the data or set of instructions which are loaded by the software components shown as control flow 510. Although the components in data flow 520 have been given names, these file names may be used for representative purposes only. Other configurations of components in data flow 520 may also be incorporated, and the depicted example in FIG. 5 is not meant to imply configural limitations with respect to the present invention.

Locations 530 provide information on the source location for the components in data flow 520.

Figure 6:
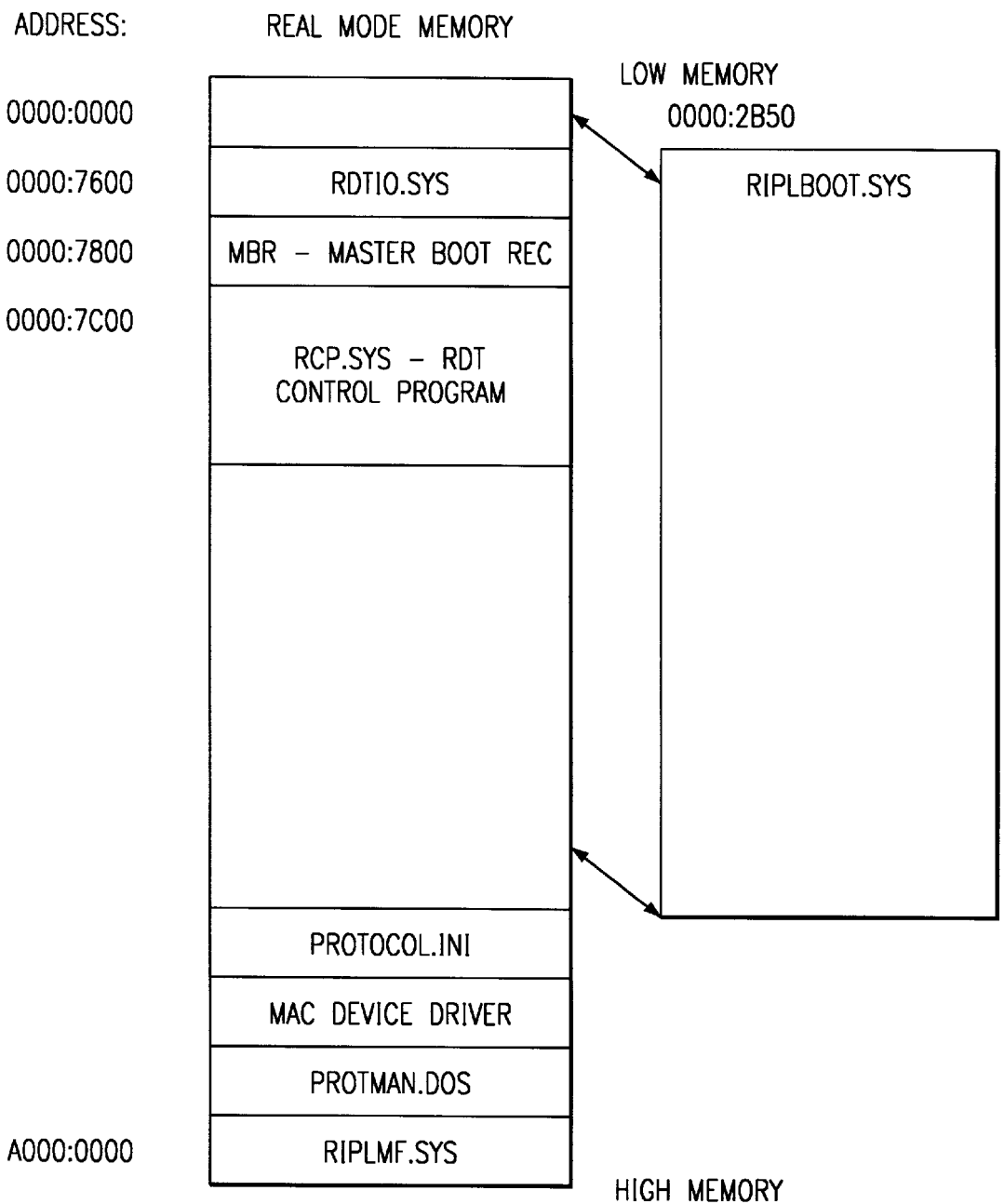
FIG. 6 is a block diagram depicting a memory map of real mode memory in a 80×86 machine using the Remote Client Boot of the present invention.

With reference now to FIG. 6, a block diagram depicts a memory map of real mode memory in a 80×86 machine as used in the present invention.

Virtually all PC's in use today allow real mode addressing from location zero (0000:0000) to 640k (A000:0000). The diagram shows that the BCL, consisting of the MBR and RDTIO, locate themselves in low storage, and load RCP- .SYS at location 0000:7C00. This is actually a predefined location where code will be loaded by the BIOS when booting from a diskette.

RCP then loads all required modules into the highest addresses possible. This is done so that the RIPLBOOT block can be loaded in low memory at its own requested location. When all drivers have been loaded and initialized, RCP gives control to RIPLMF in high memory and is no longer required. RIPLMF will load the RIPLBOOT block over all of RCB's code in low memory. This can be done because all DOS emulation, which was done by the RCP, is no longer required. RIPLMF acts as both an application program and NDIS protocol device driver. As such, there is a guarantee that DOS emulation will not be necessary.

The following descriptions provide further details of the modules used in the present invention.

Master Boot Record

The Master Boot Record (MBR), Cyl 0, Head 0, Sector 1, of the diskette is the first thing loaded into the client system after POST processing is completed. RCB requires its own version of a MBR in order to load its own control program. The MBR module is no larger than 512 bytes and contains the partition boot table for the diskette. It also contains an identity stamp, as well as code to read in the next file, named RDTIO.SYS. To acomplish this, there is a very small file system contained in the MBR. This FS has the capability of reading one sector of any file contained in the root directory of a diskette employing the 12-bit FAT architecture. The file name for RDTIO is hard-coded in the MBR and is not user-changeable.

RDTIO.SYS

RDTIO.SYS is a one sector file than is read into memory by the MBR. The main purpose of RDTIO is to provide additional file system support that will allow the reading of files of more than one sector by the BCL.

The first file read by BCL is its initialization file. This file, BCL.INI, contains the name of a self-loading, multi-sectored file that can be found in the root directory of the diskette. When this file is successfully read into memory, it will be given control, and BCL will no longer be required.

Due to its size limitations (1 Kbytes), BCL has no error recovery capabilities. When a problem occurs, such as a file not found condition, BCL will just stop. Troubleshooting should be concerned with the only two components involved, the presence of RDTIO.SYS on the diskette and possibly bad parameters in the BCL.INI file.

BCL.INI

The syntax for the BCI.INI file is very restrictive. There are only two parameters in capital letters. The parameters are: the name of the file to load and the address of the desired location, as in the following example:

RCP.SYS,0000:7C00

This instructs the BCL to load file RCP.SYS at location 0000:7C00 in real memory. There is no error checking, so the file must be in the root directory of the diskette. The address field may be optional, in which case the location 7C00 is the default. However, if the address field is used, it allows the BCL to load images, such as RIPLBOOT.SYS, directly into memory from the disk or diskette. The file name must start at the first location in the file.

RCP.SYS

The RDT Control Program is loaded by the BCL. Once loaded, there is no longer any dependency on the BCL for services. The RCP contains its own mini file system consisting of enough logic to read multi-sectored files from the root directory of a diskette which is formatted using 12-bit FAT architecture.

RCP will read an initialization file named RCP.INI from the root directory of the diskette. This file will be parsed and displayed on the console as it is used. The purpose of the .INI file is to tell RCP which drivers it needs to load to support the particular NIC on the system in which its running.

The RCP also has the responsibility of providing DOS function emulation to the device drivers when they are in their initialization routines. Things like opening and reading files, displaying messages on the console, emulating Input Output Control (IOCTL) functions, etc. It allows the device drivers to execute as though they were in a real DOS environment.

RCP.INI

RCP.INI is an initialization file read by RCP. It allows different drivers to be loaded for individual NICs without forcing source code changes in the RCP.

The file is completely "free form". The syntax is:

msgf=[file name]—where "file name" is the name of any "Message Formatter" that is to be used for this boot, i.e.: "msgf=riplmf.sys".

load=[file name]—where "file name" is the name of any module that has to be loaded to make RCB work. At a minimum, the DOS device drivers, for the NIC in the machine, must be identified this way, i.e.: "load=device.sys".

ip=[Lip address]—where "ip address" is the dotted decimal IP address, i.e.: "ip=123.456.789.012".

mac=[mac address]—where "mac address" is the 12 hex digit MAC address in a continuous string, i.e.: "mac=001122334455".

Each entry must be separated by any, or all, of the following characters:

20h=Space
0ah=Carriage return
0dh=line feed

This means that almost any editor can be used to create the file.

RIPL Message Formatter

The RIPL Message Formatter is a program that was developed as a hybrid application program and NDIS protocol device driver. It follows the NDIS specification in its actions with both PROTMAN and the MAC driver. RIPLMF's relationship to these two other programs is that of a protocol driver, however its real task is to "format" messages and present them to the MAC for delivery "on the wire". Since the other drivers must be made to believe they are working in an NDIS environment, the MF also does some emulation of his own. "BindAndStart" and "Initiate-Bind" are two areas in which this emulation is performed. According to NDIS, a protocol driver must be bound to a MAC driver. Therefore, MF must bind to the MAC such that the MAC cannot tell the diference between the MF or a DOS NDIS protocol driver.

Once bound together, the MF enters into a conversation with the MAC. This dialog is very simple in that there are only two outgoing messages the MF asks the MAC to send: "Find" and "GetFile". The find is replied to by a "Found" from the server. Once the MF knows the client system has been found, it sends out the getfile message. The server responds by sending the RIPLBOOT.SYS file to the client. When all segments of RIPLBOOT.SYS have been received, MF resets any vectors that may have been used by RCP and the other drivers, and gives the system over to RIPLBOOT.SYS. At this point no components of RCP are required, nor can they be found in the system.

The find/found dialog is based on an address that NDIS calls the Permanent Station Address. This address, which is hard wired into the NIC itself, becomes part of the outgoing message, and this is the field the server uses to decide which RIPLBOOT image to send to the client. RCP, through the use of the RCP.INI file, allows the user to specify a different Station Address to the MAC. The present invention has the advantage that a boot ROM chip, of course, offers no such capability and must use the Permanent Station Address in its communication with the LAN.

PROTMAN. DOS

PROTMAN.DOS is the DOS protocol manager device driver. According to the NDIS specification, "the Protocol Manager reads the PROTOCOL.INI file at INIT time and parses it to create the configuration memory image passed to the protocol modules." The RCB uses it for just that purpose. The MAC driver will issue IOCTL's to PROTMAN to get this information, as well as information about the protocol drivers that wish to be bound to it. RIPLMF presents itself to PROTMAN as though it were a protocol driver requesting to be bound to the MAC. This is done by placing entries in the PROTOCOL.INI file which make the MF look like a protocol driver and through IOCTL calls from MF to PROTMAN. RCB does emulate most of the other additional BindAndStart and InitiateBind logic which, in a DOS environment, comes from additional support programs. These programs are unnecessary in the RCB system.

PROTOCOL.INI

The PROTOCOL.INI file used by RCB can be the same one that is included in the RIPLBOOT.SYS image assembled in the server with some minor changes. The MF has to be added to it as follows:

[RIPLMF_MOD]
DriverName=RIPLMF$
Bindings=ELPC3

The "Bindings=" statement must point to the MAC driver, in this case ELPC3. The example above was taken from the PROTOCOL.INI used with the 3Com 3C589 PCMCIA Ethernet card. The entire file looks like this:

[protman$]
DriverName=protman$
[ELPC3]
DriverName=ELPC3$
PCMCIA_ENABLER=YES
[RIPLMF_MOD]
DriverName=RIPLMF$
Bindings=ELPC3

The advantages provided by the present invention should be apparent in light of the detailed description provided above. Prior art relies on a boot ROM, which is an inconvenient hardware feature that necessitates an extra expense. These chips are generally installed on or embedded within NIC cards. The present invention eliminates the need for a boot ROM, reducing the cost of a computer system and avoiding a costly and time-consuming upgrade process.

The hardware-based solution of the prior art does not allow any user interaction with the remote boot process. Everything that occurs in the client machine is based on the MAC address, which is a hardware name embedded in the chip. A server on the LAN that recognizes the client computer's MAC address will respond in a pre-determined way. The present invention allows a selection of MAC addresses that can provide different boots for different uses. For example, a menu could be presented to the user that provides a choice of operating systems from which to boot, such as OS/2 or JavaOS, as well as a choice of local or remote booting.

Another disadvantage is that the hardware chip does only one thing by starting the dialog with the LAN server. The RCB of the present invention can be expanded to add additional capabilities prior to connection with the LAN. For example, a security system could be added which would allow only authorized users to boot the system, etc.

Other prior art methods have booted a client by loading the DOS operating system and then starting a dialog with the server. Since RCB does not rely on an operating system, RCB can be used without DOS licenses, can be installed on existing hard disk partitions without requiring customers to re-partition their hard drives, and does not require the overhead execution of DOS.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such a floppy disc, a hard disk drive, a RAM, and CD-ROMs, and transmission-type media, such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method for booting a client computer, the method comprising the computer-implemented steps of:

executing instructions from a first memory to load a set of programs from a second memory, wherein the first memory is a BIOS ROM and the second memory is a nonvolatile, read/write memory;

executing, without an operation system, the set of programs to communicate with a network server;

executing a format program for formatting messages according to a standard for remote booting;

retrieving a boot program from the network server; and executing the boot program.

2. The method of claim 1 wherein the standard conforms to Remote Initial Program Load or Preboot Execution Environment protocol.

3. A method for booting a client computer, the method comprising the computer-implemented steps of:

executing instructions from a first memory to load a boot code loader from a second memory, wherein the first memory is a BIOS ROM and the second memory is a nonvolatile, read/write memory;

executing the boot code loader to load a control program from the second memory;

executing the control program to load a set of programs from the second memory without loading an operating system;

executing the set of programs to communicate with a network server;

retrieving a boot program from the network server; and executing the boot program.

4. The method of claim 3 wherein the step of loading the boot code loader further comprises:

loading a master boot record from the second memory; and executing instructions in the master boot record to load a first file comprising instructions for loading additional files.

5. The method of claim 4 wherein the master boot record is located in a first disk sector of the second memory, and the first file is a one sector file in a root directory of the second memory.

6. The method of claim 3 wherein the step of loading the control program further comprises:

reading a boot code loader initialization file;

parsing the boot code loader initialization file to obtain a control program file name; and loading the control program file.

7. The method of claim 6 wherein the boot code loader initialization file and the control program file are located in a root directory of the second memory.

8. The method of claim 6 further comprising:

parsing the boot code loader initialization file to obtain a control program memory address; and loading the control program file at the specified control program memory address.

9. The method of claim 3 wherein the step of loading a set of programs further comprises:

reading a control program initialization file;

parsing the control program initialization file to obtain a set of device drivers; and loading the set of device drivers.

10. The method of claim 9 wherein the control program initialization file is located in a root directory of the second memory.

11. A method for booting a client computer, the method comprising the computer-implemented steps of:

executing instructions from a first memory to load a boot code loader from a second memory, wherein the first memory is a BIOS ROM and the second memory is a nonvolatile, read/write memory;

executing the boot code loader to load a control program from the second memory;

executing the control program to load a set of programs from the second memory without loading an operating system;

executing the set of programs to communicate with a network server;

retrieving a boot program from the network server; and executing the boot program;

wherein the step of loading a set of programs further comprises:

reading a control program initialization file;

parsing the control program initialization file to obtain a set of device drivers; and loading the set of device drivers;

wherein the set of device drivers comprises:

a Media Access Control (MAC) device driver to control a network interface card on the client computer;

a protocol manager device driver for providing information associated with protocol modules to be bound to the MAC driver; and a message formatter for formatting messages to be sent by the MAC driver on a network connected to the client computer.

12. The method of claim 11 wherein the step of executing the set of programs to communicate with the network server further comprises:

reading a protocol initialization file; and emulating a set of operating system functions in the message formatter to bind the message formatter to the MAC driver.

13. The method of claim 11 further comprising:

resetting, by the message formatter, any vectors used during execution of the control program or the set of device drivers before initiating execution of the retrieved boot program.

14. The method of claim 3 wherein the step of retrieving the boot program further comprises:

sending a message to the network server to find a requested file on the network server;

receiving a message from the network server indicating that the requested file has been found;

sending a message to the network server to get the requested file; and receiving the requested file from the network server.

15. A computer program product on a computer-readable medium for booting a client computer, the computer program product comprising:

first instructions from a first memory for loading a set of programs from a second memory, wherein the first memory is a BIOS ROM and the second memory is a nonvolatile, read/write memory;

second instructions in a set of programs for communicating with a network server without an operating system;

third instructions for executing a format program for formatting messages according to a standard for remote booting;

fourth instructions for retrieving a boot program from the network server; and fifth instructions for initiating execution of the boot program.

16. The computer program product of claim 15 wherein the standard conforms to Remote Initial Program Load or Preboot Execution Environment protocol.

17. A computer program product on a computer-readable medium for booting a client computer, the computer program product comprising:

first instructions from a first memory for loading a boot code loader from a second memory, wherein the first memory is a BIOS ROM and the second memory is a nonvolatile, read/write memory;

second instructions in the boot code loader for loading a control program from the second memory;

third instructions in the control program for loading a set of programs from the second memory without loading an operating system;

fourth instructions in the set of programs for communicating with a network server;

fifth instructions for retrieving a boot program from the network server; and sixth instructions for initiating execution of the boot program.

18. The computer program product of claim 17 wherein instructions for loading the boot code loader further comprise:

instructions for loading a master boot record from the second memory; and instructions in the master boot record for loading a first file comprising instructions for loading additional files.

19. The computer program product of claim 18 wherein the master boot record is located in a first disk sector of the second memory, and the first file is a one sector file in a root directory of the second memory.

20. The computer program product of claim 17 wherein instructions for loading the control program further comprise:

instructions for reading a boot code loader initialization file;

instructions for parsing the boot code loader initialization file to obtain a control program file name; and instructions for loading the control program file.

21. The computer program product of claim 20 wherein the boot code loader initialization file and the control program file are located in a root directory of the second memory.

22. The computer program product of claim 20 further comprising:

instructions for parsing the boot code loader initialization file to obtain a control program memory address; and instructions for loading the control program file at the specified control program memory address.

23. The computer program product of claim 17 wherein instructions for loading a set of programs further comprise:

instructions for reading a control program initialization file;

instructions for parsing the control program initialization file to obtain a set of device drivers; and instructions for loading the set of device drivers.

24. The computer program product of claim 23 wherein the control program initialization file is located in a root directory of the second memory.

25. A computer program product on a computer-readable medium for booting a client computer, the computer program product comprising:

first instructions from a first memory for loading a boot code loader from a second memory, wherein the first memory is a BIOS ROM and the second memory is a nonvolatile, read/write memory;

second instructions in the boot code loader for loading a control program from the second memory;

third instructions in the control program for loading a set of programs from the second memory without loading an operating system;

fourth instructions in the set of programs for communicating with a network server;

fifth instructions for retrieving a boot program from the network server; and sixth instructions for initiating execution of the boot program;

wherein instructions for loading a set of programs further comprise:

instructions for reading a control program initialization file;

instructions for parsing the control program initialization file to obtain a set of device drivers;

instructions for loading the set of device drivers; and wherein the set of device drivers comprises:

instructions in a Media Access Control (MAC) device driver to control a network interface card on the client computer;

instructions in a protocol manager device driver for providing information associated with protocol modules to be bound to the MAC driver; and instructions in a message formatter for formatting messages to be sent by the MAC driver on a network connected to the client computer.

26. The computer program product of claim 25 wherein instructions in the set of programs for communicating with the network server further comprise:

instructions for reading a protocol initialization file; and instructions for emulating a set of operating system functions in the message formatter to bind the message formatter to the MAC driver.

27. The computer program product of claim 25 further comprising:

instructions for resetting, by the message formatter, any vectors used during execution of the control program or the set of device drivers before initiating execution of the retrieved boot program.

28. The computer program product of claim 17 wherein instructions for retrieving the boot program further comprise:

instructions for sending a message to the network server to find a requested file on the network server;

instructions for receiving a message from the network server indicating that the requested file has been found;

instructions for sending a message to the network server to get the requested file; and instructions for receiving the requested file from the network server.

29. An apparatus for booting a client computer, the apparatus comprising:

first execution means for executing instructions from a first memory to load a set or programs from a second memory, wherein the first memory is a BIOS ROM and the second memory is a nonvolatile, read/write memory;

second execution means for executing, without an operating system, the set of programs to communicate with a network server;

third instructions for executing a format program for formatting messages according to a standard for remote booting wherein the standard conforms to Remote Initial Program Load or Preboot Execution Environment protocol;

retrieving means for retrieving a boot program from the network server; and fourth execution means for executing the boot program.

30. An apparatus for booting a client computer, the apparatus comprising:

first execution means for executing instructions from a first memory to load a boot code loader from a second memory, wherein the first memory is a BIOS ROM and the second memory is a nonvolatile, read/write memory;

second execution means for executing the boot code loader to load a control program from the second memory;

third execution means for executing the control program to load a set of programs from the second memory without loading an operating system;

fourth execution means for executing the set of programs to communicate with a network server;

fifth execution means for retrieving a boot program from the network server; and sixth execution means for executing the boot program.

* * * * *

UNITED STATES PATENT AND TRADEMARK OFFICE
CERTIFICATE OF CORRECTION

PATENT NO. : 6,463,530 B1
DATED : October 8, 2002
INVENTOR(S) : Sposato

It is certified that error appears in the above-identified patent and that said Letters Patent is hereby corrected as shown below:

Column 12,
Line 27, after "ip=", please delete "[Lip address]" and insert -- [ip address] --.

Signed and Sealed this

Sixth Day of May, 2003

JAMES E. ROGAN
*Director of the United States Patent and Trademark Office*